United States Patent [19]

Watson

[11] Patent Number: 4,496,284
[45] Date of Patent: Jan. 29, 1985

[54] HELICOPTER ROTORS

[75] Inventor: Kenneth Watson, Yeovil, England

[73] Assignee: Westland plc, Yeovil, England

[21] Appl. No.: 476,484

[22] Filed: Mar. 18, 1983

[30] Foreign Application Priority Data

Mar. 18, 1982 [GB] United Kingdom ............... 8207962

[51] Int. Cl.³ .............................................. B64C 27/38
[52] U.S. Cl. ...................................... 416/138; 416/141
[58] Field of Search .................. 416/123, 114, 134 A, 416/141, 138 A

[56] References Cited

U.S. PATENT DOCUMENTS

| 3,880,551 | 4/1975 | Kisovec | 416/134 A |
| 4,093,400 | 6/1978 | Rybicki | 416/134 A X |
| 4,163,630 | 8/1979 | Weiland | 416/134 A |
| 4,182,597 | 1/1980 | Derschmidt | 416/134 A |
| 4,227,857 | 10/1980 | Reyes | 416/230 A X |
| 4,281,966 | 8/1981 | Duret et al. | 416/134 A |
| 4,299,538 | 11/1981 | Ferris et al. | 416/134 A |
| 4,307,996 | 12/1981 | Watson | 416/134 A X |
| 4,332,525 | 6/1982 | Cheney | 416/134 A |
| 4,340,335 | 7/1982 | Cheney | 416/134 A |
| 4,369,018 | 1/1983 | Brunsch et al. | 416/134 A |

FOREIGN PATENT DOCUMENTS

| 857462 | 12/1960 | United Kingdom | 416/140 A |
| 2034266 | 6/1980 | United Kingdom | 416/138 A |

Primary Examiner—Everette A. Powell, Jr.
Attorney, Agent, or Firm—Larson and Taylor

[57] ABSTRACT

Diametrically opposed rotor blades of a helicopter rotor are interconnected by a strap member which is flexible in torsion and in a plane perpendicular to a plane of rotation and has a plan profile extending between leading and trailing edges. Each rotor blade is provided with inwardly extending lever means adapted for attachment to drive means externally of the strap plan profile and adjacent one of its edges and to pitch control means externally of the plan profile and adjacent the other of its edges. In one embodiment, the lever means comprise individual levers formed integral with a connecting member rotationally fixed to the rotor blade and in a further embodiment the lever means comprise an inwardly extending torque sleeve. The drive means attachments of opposed blades lie along a common axis parallel to the plane of rotation and intersecting the axis of rotation at approximately 45 degrees to a longitudinal axis of the strap member.

8 Claims, 5 Drawing Figures

HELICOPTER ROTORS

DESCRIPTION OF INVENTION

This invention relates to helicopter rotors.

Helicopter rotors having an even number of blades have been proposed wherein opposed pairs of blades are interconnected by a common flexible member, and such rotors have become known in the art as cross-beam or strapped rotors. The latter term will be used throughout this specification.

The interconnecting strap reacts centrifugal loads and is normally flexible in torsion to accommodate pitch changes and in bending at least in a plane perpendicular to the plane of rotation in order to cater for flap movement of the blade. Usually the strap is fabricated of fibre-reinforced plastics materials.

An example of a prior strapped rotor is disclosed in GB-A-1549264. In that Specification, a four-bladed rotor has its opposite blades linked by straps that cross one another at right angles: torque is transmitted to the blades through a central boss clamped across both of the straps which each have a central aperture for the passage of a pitch control rod. A problem with this configuration is that the central clamping plates are likely to be bulky and heavy and to hide a critical central area of the straps, thereby precluding visual inspection methods. The necessity of providing a central aperture in each strap is undesirable but, more significantly, the central clamping arrangement precludes a significant length of each strap from being utilised to accommodate the necessary torsional and bending deflections experienced during operation, and dictates that such movements are confined to the length of strap external of the central clamped area.

Another possible problem with the centrally clamped arrangement of GB-A-1549264 is that both collective and cyclic pitch changes of the blades result in cyclic twisting of the respective portions of the straps, and that blade flapping movements result in cyclic bending of the straps, which combine to impose high stress concentrations tending to reduce the life of the rotor.

GB-A-1553148 attempts to alleviate some of these problems by clamping the interconnecting strap at radially spaced-apart stations using resilient clamping means. This arrangement improves the characteristics by releasing the central length of the strap to be available to cater for operational movements. However, it will be noted that the rotor hub is again rather bulky and heavy and that cyclic bending of the straps still occurs as a result of blade flapping movements.

Accordingly in one aspect the invention provides a helicopter rotor having at least one pair of diametrically opposed rotor blades arranged for rotation about an axis and interconnected by a strap member that is flexible in torsion and in a plane perpendicular to the plane of rotation, the strap member being located in the plane of rotation and having a plan profile extending between leading and trailing edges, wherein each rotor blade includes inwardly extending lever means adapted for attachment to drive means externally of the strap plan profile and adjacent one of its edges, the attachments to opposed blades lying along a common axis parallel to the plane of rotation and intersecting the axis of rotation at an angle of approximately 45 degrees to the longitudinal axis of the strap.

The lever means may be adapted for attachment to pitch control means externally of the strap plan profile and adjacent to other of its edges.

In one form of the invention the lever means may comprise individual levers formed integral with a connecting member rotationally fixed to the rotor blade, and in another form the lever means may comprise a radially inwardly extending torque sleeve attached to the rotor blade and at least partially encompassing the strap member.

The drive means may comprise a rotatable shaft having radially offset and equispaced drive arms extending axially from an outer end of the shaft and equal in number to the number of rotor blades, the outer ends of the drive arms terminating at said attachments to the lever means.

The blade pitch control means may comprise a central shaft axially movable relative the drive shaft and having a plurality of radially extending arms interposed between the drive arms and operatively connected to said lever means.

The attachments to the pitch control means may be radially offset at a distance greater than a radial dimension of the attachment to the drive means.

Preferably, the drive means attachment is located adjacent the trailing edge of the strap member.

In another aspect, the invention provides a helicopter rotor having two pairs of diametrically opposed rotor blades arranged for rotation about an axis, each blade pair being interconnected by a strap member that is flexible in torsion and in a plane perpendicular to the plane of rotation and having a plan profile extending between leading and trailing edges, drive means for rotating the rotor blades about the axis and pitch control means for collectively changing the pitch of the rotor blades, wherein each rotor blade includes inwardly extending lever means adapted for attachment to said drive means externally of the strap plan profile and adjacent one of its edges and to said pitch control means externally of the strap plan profile and adjacent the other of its edges.

The invention will now be described by way of example only and with reference to the accompanying drawings in which.

Figure 1:
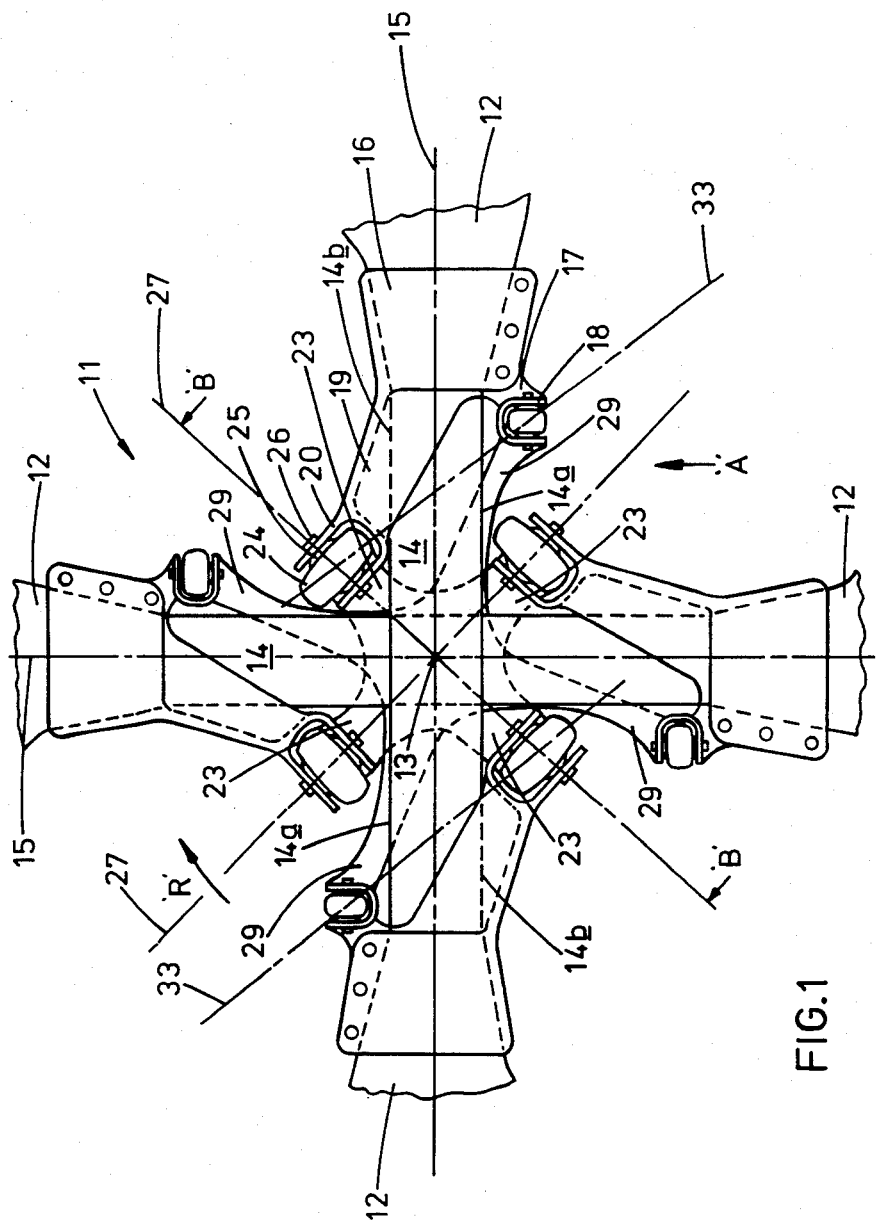
FIG. 1 is a fragmentary plan view of a four-bladed helicopter anti-torque rotor constructed in accordance with one embodiment of the invention.
Figure 2:
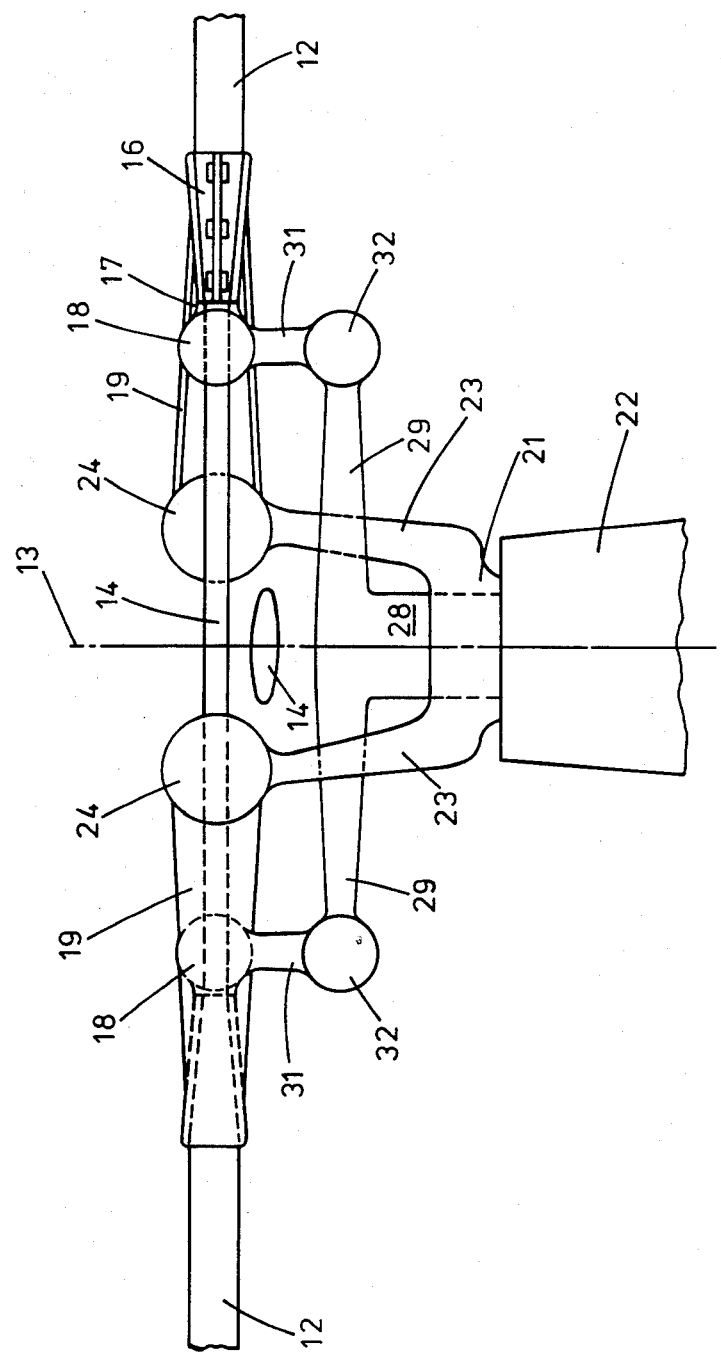
FIG. 2 is a fragmentary side elevation of the rotor of FIG. 1 taken in the direction of arrow A of FIG. 1.
Figure 3:
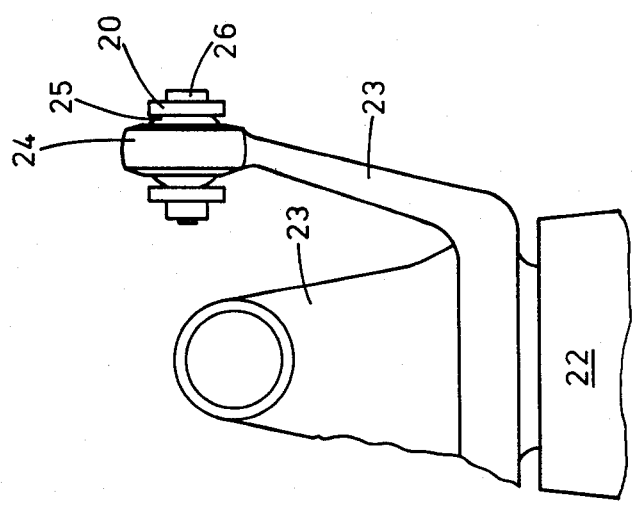
FIG. 3 is a fragmentary sectioned view taken on lines B—B of FIG. 1.

Referring now to FIGS. 1 to 3 inclusive, a helicopter anti-torque rotor 11 comprises two diametrically opposed pairs of rotor blades 12 arranged for rotation in the direction indicated by arrow R about an axis 13. The blades 12 of each pair are interconnected by a strap 14 constructed of fibre-reinforced plastics materials and which is flexible in torsion and in a plane perpendicular to the plane of rotation.

Preferably, the blades 12 are also constructed of fibre-reinforced plastics materials and each pair of blades 12 and the interconnecting strap 14 is manufactured as an integral assembly.

As illustrated in FIG. 2, each of the straps 14 has a flattened generally elliptical cross-sectional shape located with its major dimension lying in the plane of rotation. Each strap 14 has a plan profile extending between leading and trailing edges 14a and 14b relative its respective rotor blade 12 and symmetrical about a longitudinal axis 15 which is coincident with a 25 percent chord line of the respective pairs or blades 12, and which passes through the axis of rotation 13. It will be understood that the leading and trailing edges 14a and 14b of the strap member 14 correspond to those of the respective blades 12 so that the leading edge 14a of a particular strap member 14 at one side of the axis of rotation 13 comprises the trailing edge 14b at the other side and vice-versa.

Lever means are provided for connecting each blade 12 to drive means and to pitch control means, and in the embodiment of FIGS. 1 to 3, the lever means comprises a connecting member 16 clamped around a transition portion of each blade radially outwardly of the strap 14 and between the end of the strap 14 and the aerofoil section of the blade 12.

Each connecting member 16 has two integral, inwardly extending levers consisting of a short lever 17 terminating at an inner end 18 located externally of the strap plan profile and adjacent the leading edge 14a of its respective strap 14 and providing for attachment to the pitch change means, and a longer lever 19 terminating at an inner end 20 located externally of the strap plan profile and adjacent the trailing edge 14b of its respective strap 14 and providing for attachment to the drive means.

The drive means comprise a hollow drive shaft 21 (FIG. 2) rotationally mounted in a support housing 22 and connected to the helicopter transmission system (not shown) which is adapted to rotate the drive shaft 21 about the axis 13. The drive shaft 21 carries four individual drive arms 23 located symmetrically of the axis of rotation 13, each drive arm 23 extending outwardly and axially and terminating in an outer end 24 comprising a spherical joint 25 (FIG. 1).

The spherical joint 25 is attached to the inner end 20 of lever 19 by a bolt 26 for pivotal movement about an axis 27 which passes through the axis of rotation 13 and which is located at an angle of 45 degrees to the longitudinal axis 15 of the associated strap 14. It will be noted that attachments of the opposed blades 12 of each blade pair are located on a common axis 27, and that the respective axes 27 of the blade pairs are perpendicular to each other.

FIG. 3 illustrates the different lengths of the respective pairs of diametrically opposed drive arms 23, to cater for the axial offset of the respective straps 14.

The pitch control means comprises an axially slidable shaft 28 (FIG. 2) located centrally of the drive shaft 21, the shaft carrying four radially extending arms 29 interposed between the adjacent drive arms 23 of the drive shaft 21. A pitch link 31 is connected between a spherical joint 32 at the outer end of each arm 29 and a spherical joint at the inner end 18 of each of the levers 17 of the connecting members 16.

Figure 5:
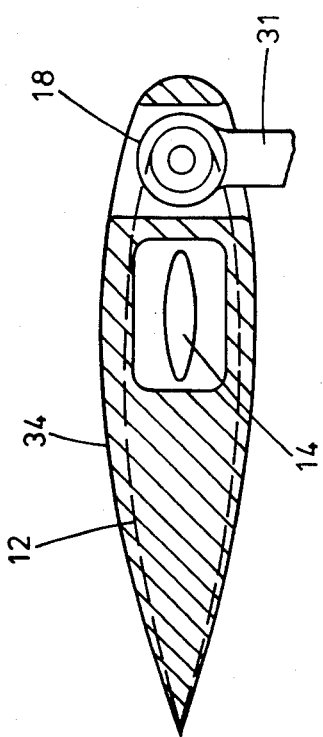
FIG. 5 is a fragmentary sectioned view taken along lines C—C of FIG. 4.
Figure 4:
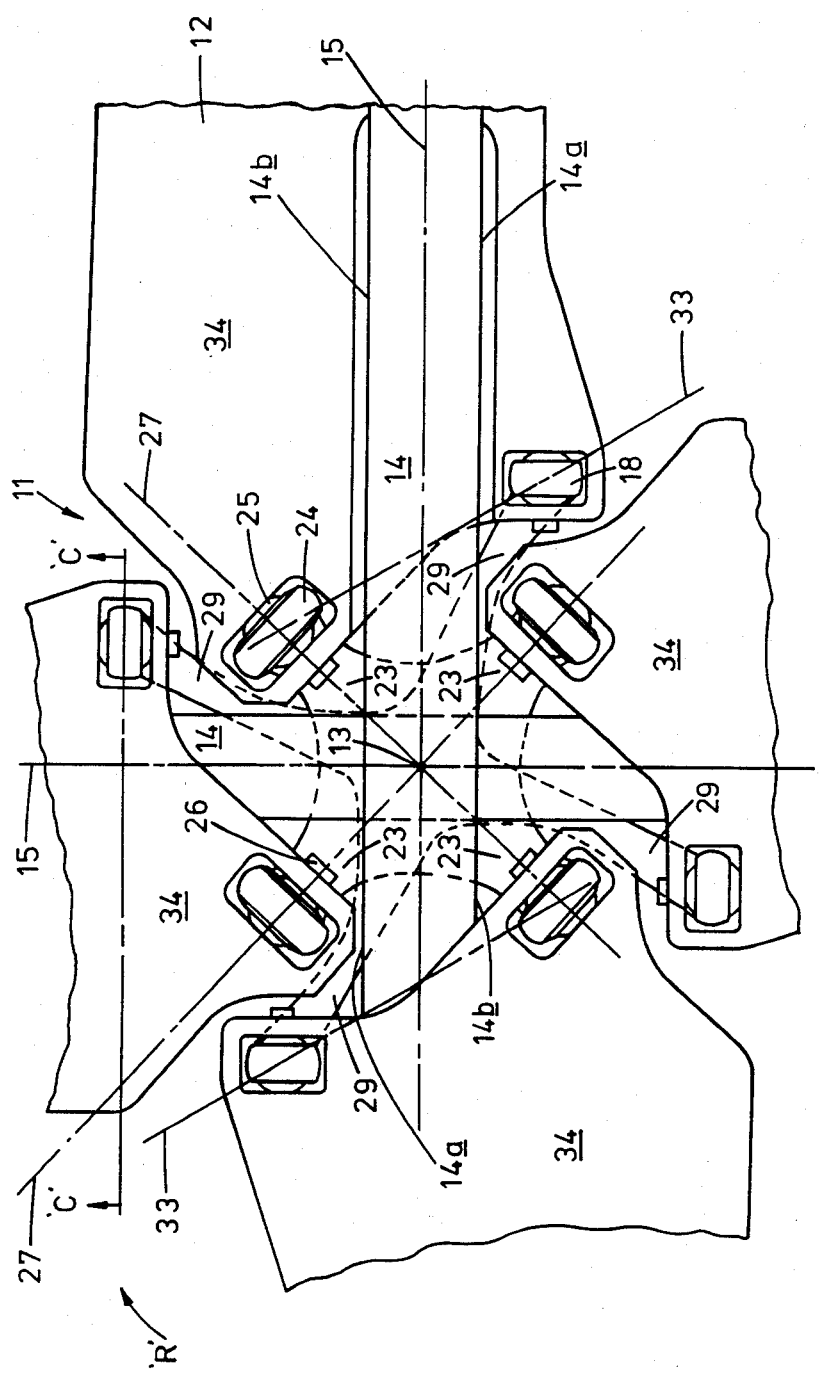
FIG. 4 is a fragmentary plan view of a four-bladed helicopter anti-torque rotor constructed in accordance with a further embodiment of the invention.

The embodiment of FIGS. 4 and 5 is similar to that previously described and like reference numerals have been used to identify similar parts. The feature of this embodiment is that it dispenses with the connecting members 16 of the embodiment of FIGS. 1 to 3 and utilizes lever means in the form of a radially inwardly extending torque sleeve 34 for attaching each blade 12 to the drive means and the pitch control means.

It will be noted in FIGS. 4 and 5 that the torque sleeve 34 encompasses a portion of the length of the associated interconnecting strap 14, and is spaced-apart therefrom as shown in FIG. 5.

Operation of the rotor of this invention will now be described with reference to the embodiment of FIGS. 1 to 3. Rotation of the drive shaft 21 is transmitted through the drive arms 23 and the levers 19 of the connecting members 16 to rotate the respective pairs of rotor blades 12 about the axis 13. Collective pitch control of the blades 12 of each pair of blades is accomplished by axial sliding movements of the control rod 28, which movements are transmitted through the arms 29, the pitch links 31 and the levers 17 of the connecting members 16.

Thus, rotation of the rotor according to this invention is transmitted to the rotor blades 12 without any physical connection to the interconnecting straps 14, thereby releasing the whole of the length of the straps 14 for utilisation in bending and torsion in a manner now to be described.

The collective pitch adjustment of the blades 12 of each pair of blades is permitted by twisting of the respective interconnecting straps 14, and it will be noted that the axial control movements are reacted at the fixed attachments of the levers 19 to the drive arms 23. The radial offset of the respective attachments to the drive means and the pitch control means provides a hinge configuration effective about a bend line 33 or virtual hinge that is automatically established through the centres of the spherical attachments at the ends of levers 17 and 19 of the connecting members 16, and is arranged so that the pitching moment associated with a change in the pitch angle of a blade 12 counteracts a propeller moment tending to reduce the pitch setting due to centrifugal forces, thereby minimising the resulting loads on the controls and eliminating the need for counterbalance weights.

Flap movements of a rotor blade are movements which occur in a plane perpendicular to the plane of rotation, and flapping movements of opposed pairs of blades are normally understood to mean one blade moving in one direction in the perpendicular plane and the other blade moving in the opposite direction. In the rotor of the present invention, such flapping movements of opposed pairs of blades takes place by virtue of the blades pivoting in unison about the common angled axes 27 and, in this respect, the present rotor operates in a manner similar to two-bladed mechanical rotors of a type which have become known in the art as teetering rotors.

It is important to note that the present invention extends this teetering rotor concept for the first time to a strapped rotor configuration, and that the arrangement of the invention means that no cyclic bending of the strap 14 occurs during such blade flapping movements, thereby greatly reducing the operational stresses in the straps 14. Some twisting of the straps 14 does occur due to the flapping movement: however, this is minimised by the Delta three effect resulting from the pivoting about the common angled axes 27 and the fact that each blade 12 is restrained by its connection at 18 to the end of short lever 17 of the connector 16. The Delta three effect also functions to reduce undesirable pitch/flap coupling, by automatically adjusting the pitch setting as the blade flaps, so as to reduce flap movements resulting from imposed pitch changes.

In respect of coning movements, i.e. in which both blades 12 of an opposed pair move in the same direction in the plane perpendicular to the plane of rotation, some bending of the interconnecting straps 14 does occur; however, this is a steady-state bending only. It will be noted that such coning movements of the blades occur by virtue of bending either along the hinge line established by the flapping axes 27 or along the bend line 33. Alternatively, the bending relief may be accommodated by a combined movement about both hinge lines 27 and 33 as a result of a change in the bending modulus associated with the twisting of the straps 14.

The arrangement of the invention in which the attachment to the pitch control means is at a greater radial distance from the axis of rotation 13 than the attachment to the drive means ensures that bend line 33 is also at an angle to the longitudinal axis 15, thereby again establishing a Delta three effect in respect of coning movements, tending automatically to reduce such coning movements, thereby reducing the steady-state bending effect.

It will be understood that the embodiment of FIGS. 4 and 5 operates in a manner identical to that of the embodiment of FIGS. 1 to 3 except that driving torque and collective pitch change movements are transmitted through the torque sleeve 34.

Whilst two embodiments have been described and illustrated it will be understood that many modifications can be made without departing from the scope of the invention as defined in the appended claims.

What is claimed is:

1. A helicopter rotor including, rotor drive means, pitch control means, at least one pair of diametrically opposed rotor blades arranged for rotation about an axis, a generally flattened strap member interconnecting opposed blade pairs with its major dimension coincident with the plane of rotation and extending between leading and trailing edges, the strap member being flexible in torsion and in a plane perpendicular to the plane of rotation, lever means attached to each rotor blade and including first connection means pivotally attached to said rotor drive means externally of the strap member and adjacent one of its edges so that the pivotal attachments of opposed blades are on a common axis parallel to the plane of rotation and intersecting the axis of rotation at approximately 45 degrees to the longitudinal axis of the strap member, and second connection means pivotally attached to said pitch control means externally of the strap member and adjacent the other of its edges.

2. A helicopter rotor having two pairs of diametrically opposed rotor blades arranged for rotation about an axis, a strap member for interconnecting each blade pair, each strap member being in a plane perpendicular to the plane of rotation and having an plan profile extending between leading and trailing edges, drive means for rotating the rotor blades about the axis and pitch control means for collectively changing the pitch of the rotor blades, first inwardly extending lever means on each rotor blade attached to said drive means externally of the strap plan profile and adjacent one of the edges of the rotor blade and second inwardly extending lever means on each rotor blade attached to said pitch control means externally of said strap plan profile and adjacent the other of the edges of the rotor blade.

3. A rotor as claimed in claim 1, wherein the lever means comprise individual levers formed integral with a connecting member rotationally fixed to the rotor blade.

4. A rotor as claimed in claim 1, wherein the lever means comprise a radially inwardly extending torque sleeve attached to the rotor blade and at least partially encompassing the strap member.

5. A rotor as claimed in claim 1, wherein the drive means comprise a rotatable drive shaft having individual drive arms equal in number to the number of rotor blades, and extending outwardly and axially from an outer end of the shaft, outer ends of the drive arms terminating at said attachments to the lever means.

6. A rotor as claimed in claim 5, wherein said pitch control means comprise a central shaft axially movable relative to drive shaft and having a plurality of radially extending arms interposed between the drive arms and operatively connected to said lever means.

7. A rotor as claimed in claim 6, wherein the attachments of the pitch control means is offset at a radial distance greater than a radial distance of the attachment of the drive means.

8. A rotor as claimed in claim 1, wherein the drive means attachment is located adjacent the trailing edge of the strap member.

* * * * *